3,450,651
**SODIUM CARBONATE-FREE PHENOL-FORMAL-
DEHYDE ADHESIVE COMPOSITIONS**
John P. Carstensen, Seattle, Wash., assignor to Monsanto
Company, St. Louis, Mo., a corporation of Delaware
No Drawing. Filed July 29, 1964, Ser. No. 386,057
Int. Cl. C08g 37/16; C09j 3/24; B32b 21/14
U.S. Cl. 260—7                                                10 Claims This application relates to resinous adhesive compositions. More particularly, it relates to aqueous alkaline phenol-formaldehyde resin adhesive compositions and a method for their preparation.

In the manufacture of plywood, wooden veneers are coated with an adhesive composition and then assembled or laid-up into a plurality of veneers, e.g., 5-ply, comprising what is termed a plywood assembly. Mills conventionally stack a large number of these assemblies into a pile and then place the pile under an initial cold compression, called pre-press, in order to effect an initial adhesive bond between the adjacent veneers in each plywood assembly so that each assembly may be handled in further processing operations without disrupting the alignment of the veneers comprising the assembly. The time elapsed from assembly of the veneers until the pre-press is commonly referred to as the stand time before pre-press. The presently available adhesive compositions require a relatively lengthy stand time and pre-press time in order to achieve acceptable pre-press bond strengths. Adhesive compositions are continuously being sought which will reduce the necessary stand time and pre-press time associated with developing satisfactory pre-press bond strength and, at the same time, maintain satisfactory assembly time tolerance. The time elapsed from the initial assembly of the veneers until full hot press pressure is attained (including pre-press operation) is commonly referred to as the assembly time. Assembly time tolerance and pre-press bond strength are inversely related and the problem of increasing the pre-press bond strength without severely limiting the assembly time tolerance becomes extremely difficult.

It is an object of this invention to provide novel adhesive compositions.

Another object is the provision of novel adhesive compositions containing aqueous alkaline phenol-formaldehyde resins.

Another object is the provision of adhesive compositions having improved pre-press properties.

Another object is the provision of adhesive compositions having a commercially acceptable balance of pre-press properties, i.e., short stand time, short pre-press time, and high bond strength, while maintaining adequate assembly time tolerance.

These and other objects are accomplished through the provision of a method for preparing aqueous alkaline thermosetting adhesive compositions which comprise (1) combining water, sodium hydroxide and from 10 to 40 parts by weight of a filler, (2) at least partially digesting said filler, (3) charging (a) from 20 to 100 parts, on a solids basis, of an aqueous alkaline phenol-formaldehyde condensate, (b) from 2 to 20 parts by weight of a blood of low solubility in the range of from 10 to 40%, and (c) from zero to 15 parts by weight of an amylaceous material, (4) charging additional filler to a total filler content of from 25 to 60 parts by weight, and (5) charging from zero to 80 parts, to a total of 100 parts, by weight, on a solids basis, of an aqueous alkaline phenol-formaldehyde condensate, said phenol-formaldehyde condensate having a number average molecular weight of at least 1500 and containing less than 1% residual free formaldehyde based upon the total formaldehyde used.

The following examples are presented in illustration of the invention and are not intended as limitations thereon. Where parts are used they are parts by weight.

EXAMPLE I

This example is presented for comparative purposes. It illustrates the preparation of a typical, commercially available, plywood adhesive in current use for pre-press applications.

A pilot-plant glue mixer is charged with 190 parts of water at 70° F., agitation is started and 70 parts of Furafil 100 and 5 parts of booster wheat flour are added and mixing is continued for about 2 minutes. 40 parts of a 50% by weight aqueous solution of sodium hydroxide are added and mixing is continued for about 2 minutes. 18 parts of soda ash are added and mixing is continued for about 15 minutes. 3 parts of diesel oil (a defoamer) are added and mixing is continued for about 2 minutes. 15 parts of an 80% soluble blood are added and mixing is continued for about 5 minutes. Finally, 500 parts of a 40% PMMA solids aqueous alkaline solution of a phenol-formaldehyde resin having a number average molecular weight of about 2200 and a MacMichael viscosity at 70° F. of 60 on the 26d wire are added and mixing is continued for about 5 minutes. The resin is prepared by the condensation reaction of 1.0 mol of phenol with 2.0 mols of formaldehyde in the presence of 0.75 mol of sodium hydroxide, which latter was added in three portions of 0.15, 0.3 and 0.3 mol, respectively.

EXAMPLE II

This example presents the best mode contemplated of practicing the present invention. It will be noted that this example differs from Example I, above, in several regards; i.e., no soda ash is present, only about one-half of the normal proportion of sodium hydroxide is used, the phenolic resin is added in a split addition, the Furafil 100 filler is added in a split addition, the blood used is of lower solubility, and a gelatinous wheat flour is used.

A pilot-plant glue mixer is charged with 160 parts of water at 70° F., agitation is started and 60 parts of Furafil 100 are added and mixing is continued for about 2 minutes. 20 parts of a 50% by weight aqueous solution of sodium hydroxide are added and mixing is continued for about 15 minutes. 160 parts of a 40% PMMA solids aqueous solution of a phenol-formaldehyde resin having a number average molecular weight of about 2200 and a MacMichael viscosity at 70° F. of about 60 on the 26d wire are added and mixing is continued for about 5 minutes. Then are added 20 parts of Furafil 100, 10 parts of a gelatinous wheat flour and 10 parts of a 20% soluble blood and mixing is continued for about 5 minutes. 2 parts of diesel oil (a defoamer) are added and mixing is continued for about 5 minutes. Finally, 340 parts of the same 40% PMMA solids aqueous alkaline phenol-formaldehyde resin solution added above are added and mixing is continued for about 5 minutes. The resin used in this example is prepared as described in Example I.

EXAMPLE III

This example presents an alternate adhesive within the scope of the present invention.

A pilot-plant glue mixer is charged with 195 parts of water at 70 F., agitation is started and 75 parts of Furafil 100 are added and mixing is continued for about 2 minutes. 28 parts of a 50% by weight aqueous solution of sodium hydroxide are added and mixing is continued for about 15 minutes. 140 parts of a 40% PMMA solids aqueous alkaline solution of a phenol-formaldehyde resin having a number average molecular weight of about 2200 and a MacMichael viscosity at 70° F. of 60 on the 26d wire are added and mixing is continued for about 5 minutes. Then are added 18 parts of Furafil 100, 10 parts of a gelatinous wheat flour, 10 parts of a 20% soluble blood, 1.5 parts of powdered borax and 2.5 parts of diesel oil (a defoamer) and mixing is continued for about 5 minutes. Finally, 360 parts of the same 40% PMMA solids aqueous alkaline phenol-formaldehyde resin solution added above are added and mixing is continued for about 5 minutes. The resin used in this example is prepared as described in Example I.

EXAMPLE IV

The adhesive compositions of Examples I and II are evaluated in their pre-press properties, laying up 2-ply cross-lap test panels and pulling them apart on a laboratory puller equipped with gripping means and a scale for measuring the pounds of pull. A 3/16" Douglas fir veneer is cut into a series of 4⅞" by 5⅞" panels. Pairs of panels are selected and one surface of one panel from each pair is coated with 30 pounds per MSGL (thousand square feet of single glue line) of the selected adhesive composition. The second panel is then placed across the coated surface of the first panel with this grain running at a 90° angle to the grain of the first panel and with the long dimension of each panel overlapping the short dimension of the other panel on all sides. A series of four 2-ply assemblies are made with each adhesive composition, stacking the four assemblies and placing on top of the uppermost assembly a brick weighing 1½ pounds, simulating the stack of assembled veneers awaiting pre-pressing in a plywood mill. Each assembly is permitted to remain in this stack for a pre-determined period of time (herein defined as the stand time before pre-press) prior to cold pressing at 70° F. and 175 p.s.i. pressure for 4 minutes. The pressed assembly is then broken on a laboratory puller having a fixed base jig under which the overlapping ends of one panel are placed and a second, movable jig attached to a scale under which the overlapping ends of the second panel are placed. The assembly is then pulled apart, using a load rate of about 10 pounds per second, recording the pounds of pull at the break for each assembly. The results obtained using the adhesive compositions of Examples I and II are recorded in table, infra.

TABLE

| Assembly time (minutes) | Press time (minutes) | Strength of pre-press bond using adhesives of— | |
|---|---|---|---|
| | | Example I, (lbs.) | Example II, (lbs.) |
| 2 | 4 | 30 | 60 |
| 7 | 5 | 55 | 100 |
| 15 | 5 | 65 | 100 |
| 22 | 5 | 75 | 75 |

The above test results show that the adhesive compositions of this invention have remarkably improved pre-press properties at all but the longest assembly time as compared to the currently used pre-press glue formulation.

The phenol-formaldehyde resins employed in the practice of this invention are rather peculiarly limited in two regards. First, they should have a number average molecular weight of at least 1500, and preferably of at least 2000. The maximum molecular weight is limited only by the usefulness of the phenolic resin as an adhesive component, as is known to those skilled in the art. Secondly, the phenolic resin should have a low free formaldehyde content, i.e., below about 1%, and preferably below about 0.5%, based upon total formaldehyde employed in the preparation of the resin. Aside from these limitations, the phenolic resins used are the conventional alkaline condensed resoles employed as plywood adhesives. They may be prepared as taught in, e.g., Redfern Re. 23,347, Van Epps 2,360,376, Stephen et al. 2,437,981, etc. However, not all resins taught in the above references meet the limitations outlined above and care must be exercised in selecting only those resins meeting the above criteria.

In a preferred embodiment, the phenolic resins employed are those prepared by reacting from about 1.75 to 3.0 mols of formaldehyde with 1.0 mol of phenol in the presence of from about 0.5 to 1.1 mols of sodium hydroxide, the latter preferably being added in two or more increments at predetermined stages in the resin preparation.

Phenol is the preferred phenolic constituent of the phenolic resins used in the practice of this invention. However, up to 15% by weight of the phenol may be replaced with other phenolic constituents such as the cresols, xylenols and certain polyphenyl phenols which occur in still bottoms in the distillation purification of phenol and vanillin. Commercially available phenol fractions may also be used. The formaldehyde employed may be substantially pure or it may be a commercially available aqueous solution thereof. For practical reasons, formalin, either 37% or 50 % aqueous formaldehyde, is usually employed. Methanol, a polymerization inhibitor added to stabilize against polymerization to paraformaldehyde in storage, may be present in the formaldehyde.

The blood employed in the practice of this invention is of low solubility within the range of from about 10 to 40%. More preferable blood having a solubility of from 15 to 25% is used. While both hog blood and beef blood are generally available and either may be used, it is preferred to use either pure beef blood or a mixture of hog and beef blood containing less than about 25% by weight of hog blood. The blood may be present in proportion of from about 2 to 20 parts per 100 parts of phenolic resin PMMA solids. However, it is preferred to use from 5 to 10 parts of blood per 100 phenolic resin solids. The blood should not be added until after the digestion of the initial filler and may be added before, concurrently with, or after the addition of at least a portion of the phenolic resin.

Conventional fillers employed in adhesive compositions may be used in the practice of this invention. Such fillers include clay, talc, whiting, calcite, etc., cellulosic materials such as wood flour, ground corn cobs, Furafil, certain fractions of bark flour, nut shell flour such as walnut shell flour, the endocarps of drupes such as apricots, peach and prune, etc., peat, etc. In a preferred embodiment, however, the filler employed is Furafil which is defined as a solid furfural by-product residue from the acid hydrolysis of a pentosan-containing material such as ground oat hulls or ground corn cobs. Furafil is more completely described in U.S. 2,727,869. An important feature of this invention is the split addition of the filler at at least two different points in the adhesive preparation. Thus, from 10 to 40 parts of filler per 100 parts of phenolic resin PMMA solids are added prior to adding any phenolic resin or blood. Sufficient proportion of an alkaline component must be present at this point to effect at least a partial digestion of filler. The remaining filler, up to a total filler content of from about 25 to 60 parts per 100 parts of phenolic PMMA solids, is added after at least a portion of the phenolic resin has been added.

An amylaceous material is an optional but preferred ingredient of the adhesive compositions of this invention. Such amylaceous materials, therefore, may be present in proportion of from zero to about 15 parts by weight per 100 parts by weight of phenolic PMMA solids. More preferably, however, at least two parts to 15 parts of amylaceous material will be empoyed. Exemplary of suitable amylaceous materials are, for example, cereal grain flours such as wheat flour, rye flour, barley flour, oat flour, etc. The preferred amylaceous material is gelatinized wheat flour.

The sodium hydroxide is employed in the proportion of from about 2 to 10 parts, on a concentrated basis, by weight, per 100 parts by weight of phenolic PMMA solids. Preferably from about 3.5 to 7 parts by weight of sodium hydroxide is used. The sodium hydroxide is, however, normally used in the form of a dilute aqueous solution, e.g., 50% by weight, and is normally present during the digestion of the initially added filler. It should be noted that this level of alkali concentration is considerably lower than that normally associated with adhesive formulations intended for pre-press uses.

The adhesive compositions of this invention are characterized by the absence of soda ash (i.e. sodium carbonate) or other buffering salts from the adhesive composition as well as by the use of considerably less alkali in the adhesive composition, the use of a critical phenolic resin, the use of a critical blood, the divided addition of the filler and the optional use of an amylaceous material. It is these factors all taken in combination which provide the desired result of this invention. However, adhesive compositions of this invention may additionally contain such conventional additives as defoamers, viscosity control additives, hardening agents, etc.

It is obvious that many variations may be made in the products and processes set forth above without departing from the spirit and scope of this invention.

What is claimed is:

1. An aqueous alkaline thermosetting adhesive composition having improved pre-press properties consisting of (1) 100 parts by weight, on a solids basis, of an aqueous alkaline phenol-formaldehyde condensate having a number average molecular weight of at least 1500 and containing less than 1% residual free formaldehyde based upon the total formaldehyde used, (2) from 2 to 10 parts by weight of sodium hydroxide, (3) from 2 to 20 parts by weight of a blood of low solubility in the range of from 10 to 40%, (4) from zero to 15 parts by weight of an amylaceous material, and (5) from 25 to 60 parts by weight of a filler.

2. An aqueous alkaline thermosetting adhesive composition having improved pre-press properties consisting of (1) 100 parts by weight, on a solids basis, of an aqueous alkaline phenol-formaldehyde condensate having a number average molecular weight of at least 1500 and containing less than 1% residual free formaldehyde based upon the total formaldehyde used, (2) from 2 to 10 parts by weight of sodium hydroxide, (3) from 2 to 20 parts by weight of a blood of low solubility in the range of from 10 to 40%, (4) from 2 to 15 parts by weight of an amylaceous material, and (5) from 25 to 60 parts by weight of a filler.

3. An aqueous alkaline thermosetting adhesive composition as in claim 2 wherein the amylaceous material is gelatinized wheat flour.

4. An aqueous alkaline thermosetting adhesive composition as in claim 2 wherein the filler is a solid furfural by-product residue from the acid hydrolysis of a pentosan-containing material selected from the group consisting of ground oat hulls and ground corn cobs.

5. An aqueous alkaline thermosetting adhesive composition as in claim 2 wherein the amylaceous material is gelatinized wheat flour and the filler is a solid furfural by-product residue from the acid hydrolysis of a pentosan-containing material selected from the group consisting of ground hulls and ground corn cobs.

6. A process for preparing aqueous alkaline thermosetting adhesive compositions which comprise (1) combining water, from 2 to 10 parts by weight of sodium hydroxide, and from 10 to 40 parts by weight of a filler, (2) at least partially digesting said filler, (3) charging (a) from 20 to 100 parts, on a solids basis, of an aqueous alkaline phenol-formaldehyde condensate, (b) from 2 to 20 parts by weight of a blood of low solubility in the range of from 10 to 40%, and (c) from zero to 15 parts by weight of an amylaceous material, (4) charging additional filler to a total filler content of from 25 to 60 parts by weight, and (5) charging from zero to 80 parts by weight, to a total of 100 parts, on a solids basis, of an aqueous alkaline phenol-formaldehyde condensate, said phenol-formaldehyde condensate having a number average molecular weight of at least 1500 and containing less than 1% residual free formaldehyde based upon the total formaldehyde used.

7. A process for preparing aqueous alkaline thermosetting adhesive compositions which comprises (1) combining water, from 2 to 10 parts by weight of sodium hydroxide, and from 10 to 40 parts by weight of a filler, (2) at least partially digesting said filler, (3) charging (a) from 20 to 100 parts, on a solids basis, of an aqueous alkaline phenol-formaldehyde condensate, (b) from 2 to 20 parts by weight of a blood of low solubility in the range of from 10 to 40%, and (c) from 2 to 15 parts by weight of anamylaceous material, (4) charging additional filler to a total filler content of from 25 to 60 parts by weight, and (5) charging from zero to 80 parts by weight, to a total of 100 parts, on a solids basis, of an aqueous alkaline phenol-formaldehyde condensate, said phenol-formaldehyde condensate having a number average molecular weight of at least 1500 and containing less than 1% residual free formaldehyde based upon the total formaldehyde used.

8. A process as in claim 7 wherein the amylaceous material is gelatinized wheat flour.

9. A process as in claim 7 wherein the filler is solid furural by-product residue from the acid hydrolysis of a pentosan-containing material selected from the group consisting of ground oat hulls and ground corn cobs.

10. A process as in claim 7 wherein the amylaceous material is gelatinized wheat flour and the filler is a solid furfural by-product residue from the acid hydrolysis of a pentosan-containing material selected from the group consisting of ground oat hulls and ground corn cobs.

References Cited

UNITED STATES PATENTS

| 2,874,134 | 2/1959 | Gossett et al. | 260—7 |
| 2,878,197 | 3/1959 | Boxter et al. | 260—17.2 |
| 3,213,045 | 10/1965 | Klein et al. | 260—7 |

FOREIGN PATENTS

| 153,590 | 10/1953 | Australia. |

WILLIAM H. SHORT, *Primary Examiner.*

E. M. WOODBERRY, *Assistant Examiner.*